US011421985B2

(12) United States Patent
Shimada et al.

(10) Patent No.: US 11,421,985 B2
(45) Date of Patent: Aug. 23, 2022

(54) METHOD FOR INSPECTING MEMBRANE ELECTRODE STRUCTURE (71) Applicant: HONDA MOTOR CO., LTD., Tokyo (JP)

(72) Inventors: Koya Shimada, Tochigi (JP); Hiroshi Kurata, Tochigi (JP); Shohei Yoshida, Tochigi (JP); Keiichi Shiraishi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 17/163,950

(22) Filed: Feb. 1, 2021

(65) Prior Publication Data
US 2021/0239463 A1 Aug. 5, 2021

(30) Foreign Application Priority Data

Feb. 4, 2020 (JP) .............................. JP2020-017230

(51) Int. Cl.
G01B 15/02 (2006.01)
G01N 23/223 (2006.01)
H01M 4/88 (2006.01)
H01M 8/1004 (2016.01)
(52) U.S. Cl.
CPC ........... *G01B 15/02* (2013.01); *G01N 23/223* (2013.01); *H01M 4/8807* (2013.01); *H01M 8/1004* (2013.01); *G01N 2223/633* (2013.01); *G01N 2223/646* (2013.01)

(58) Field of Classification Search
CPC .... G01B 15/02; G01B 15/025; G01N 23/223; G01N 2223/633; G01N 2223/646; G01N 2223/611; G01N 23/04; H01M 4/8807; H01M 8/1004; H01M 2008/1095; H01M 4/925; H01M 8/10; Y02E 60/50
See application file for complete search history.

(56) References Cited

U.S. PATENT DOCUMENTS

2019/0302035 A1\* 10/2019 Kashu .................. G01V 5/0016
2019/0304126 A1\* 10/2019 Kashu .................. G06T 7/0002

FOREIGN PATENT DOCUMENTS

JP            2019-66246 A      4/2019

\* cited by examiner

*Primary Examiner* — Kiho Kim
(74) *Attorney, Agent, or Firm* — WHDA, LLP (57) ABSTRACT A method for inspecting a membrane electrode structure (1) which includes a first step in which detection medium capable of detecting elements of a first electrode catalyst layer (12) and a second electrode catalyst layer (22) and an element of a metal foreign matter (40) is sent along a thickness direction from the side of a first electrode layer (10) to a second electrode layer (20) side to obtain a thickness direction profile of a detection signal, and a second step in which an analysis unit identifies a thickness direction position of the metal foreign matter (40), from intensity of the detection signal in the thickness direction profile, and in which the analysis unit identifies thickness direction positions of the first and second electrode catalyst layer (12)(22), or a thickness direction position of an electrolyte membrane (30), from the intensity of the detection signal in the thickness direction profile.

5 Claims, 5 Drawing Sheets

METHOD FOR INSPECTING MEMBRANE ELECTRODE STRUCTURE

BACKGROUND OF THE INVENTION

Field of the Invention

The present invention relates to a method for inspecting a membrane electrode structure.

Description of the Related Art

There has been conventionally known a method for measuring a membrane thickness of a membrane electrode structure comprising an electrolyte membrane made of a solid polymer (see, for example, Japanese Patent Laid-Open No. 2019-66246).

When, although the membrane thickness of the electrolyte membrane is sufficient, a metal foreign matter is mixed in the membrane electrode structure, durability of the membrane electrode structure may significantly deteriorate. Accordingly, it is conceivable that whether a metal foreign matter is present in the membrane electrode structure is confirmed by means of a transmitted X-ray inspection apparatus, and that, when a metal foreign matter is present, it is discarded.

However, it is found that, even when a metal foreign matter is present in the membrane electrode structure, if the metal foreign matter is present in the gas diffusion layer and the metal foreign matter is sufficiently apart from the electrode catalyst layer or the electrolyte membrane, no problem occurs.

Furthermore, when a metal foreign matter is present in the membrane electrode structure, in a case where the electrolyte membrane, the electrode catalyst layer, and the gas diffusion layer are laminated and manufactured, if it is possible to identify in which manufacturing step the metal foreign matter was mixed, improving the step enhances the yield of the membrane electrode structure.

In view of the above, the present invention has an object to provide a method for inspecting a membrane electrode structure which can identify a thickness direction position of a metal foreign matter in the membrane electrode structure.

SUMMARY OF THE INVENTION

[1] To achieve the object, the present invention is a method for inspecting a membrane electrode structure formed by sandwiching an electrolyte membrane between a first electrode layer having a first electrode catalyst layer and a first gas diffusion layer, and a second electrode layer having a second electrode catalyst layer and a second gas diffusion layer, and the method comprises a first step in which a detection medium capable of detecting elements of the first electrode catalyst layer and the second electrode catalyst layer or an element of the electrolyte membrane, and an element of a metal foreign matter is sent such that a focal point is moved along a thickness direction from a side of the first electrode layer to aside of the second electrode layer, thereby obtaining a thickness direction profile of a detection signal, and a second step in which an analysis unit identifies a thickness direction position of the metal foreign matter, from intensity of the detection signal in the thickness direction profile, and in which the analysis unit identifies thickness direction positions of the first electrode catalyst layer and the second electrode catalyst layer, or a thickness direction position of the electrolyte membrane, from the intensity of the detection signal in the thickness direction profile.

According to the present invention, with respect to the first electrode catalyst layer, the second electrode catalyst layer, or the electrolyte membrane, the thickness direction position of the metal foreign matter in the membrane electrode structure can be identified.

[2] Furthermore, in the present invention, preferably, provided is a third step in which the thickness direction position of the metal foreign matter which has been identified by the second step is compared with the thickness direction positions of the first electrode catalyst layer and the second electrode catalyst layer, or the thickness direction position of the electrolyte membrane, and in which, when the metal foreign matter is spaced apart from the first electrode catalyst layer and the second electrode catalyst layer, or the electrolyte membrane, at equal to or more than a predetermined value in the thickness direction, the membrane electrode structure is determined as a non-defective product.

According to the present invention, when the metal foreign matter is spaced apart from the first electrode catalyst layer and the second electrode catalyst layer, or the electrolyte membrane, at equal to or more than the predetermined value in the thickness direction, the membrane electrode structure can be handled as the non-defective product.

[3] Furthermore, in the present invention, preferably, the predetermined value is set to a value at which the metal foreign matter is present in the first gas diffusion layer or the second gas diffusion layer.

According to the present invention, when the metal foreign matter is present in the first gas diffusion layer or the second gas diffusion layer, the membrane electrode structure can be determined as the non-defective product.

[4] Furthermore, in the present invention, preferably, provided is, prior to the first step, a scanning step of scanning a surface of the membrane electrode structure and detecting a presence or absence of the metal foreign matter, and the first step and the second step are performed at a location where the metal foreign matter has been detected by the scanning step.

According to the present invention, without the necessity of performing inspection of the metal foreign matter in the thickness direction in the entire region of the membrane electrode structure, the surface of the membrane electrode structure is scanned, and the thickness direction position can be identified at a location where the metal foreign matter has been found, so that inspection of the membrane electrode structure can be performed quickly.

Furthermore, in the present invention, preferably, provided is a fourth step in which the thickness direction position of the metal foreign matter which has been identified by the second step is compared with the thickness direction positions of the first electrode catalyst layer and the second electrode catalyst layer, or the thickness direction position of the electrolyte membrane, and in which, based on the comparison result, of manufacturing steps of the first electrode catalyst layer and the second electrode catalyst layer, the electrolyte membrane, and the membrane electrode structure, in which manufacturing step the metal foreign matter was mixed is identified.

According to the present invention, in which manufacturing step the metal foreign matter was mixed can be identified.

DETAILED DESCRIPTION OF THE PREFERRED EMBODIMENTS

Figure 1:
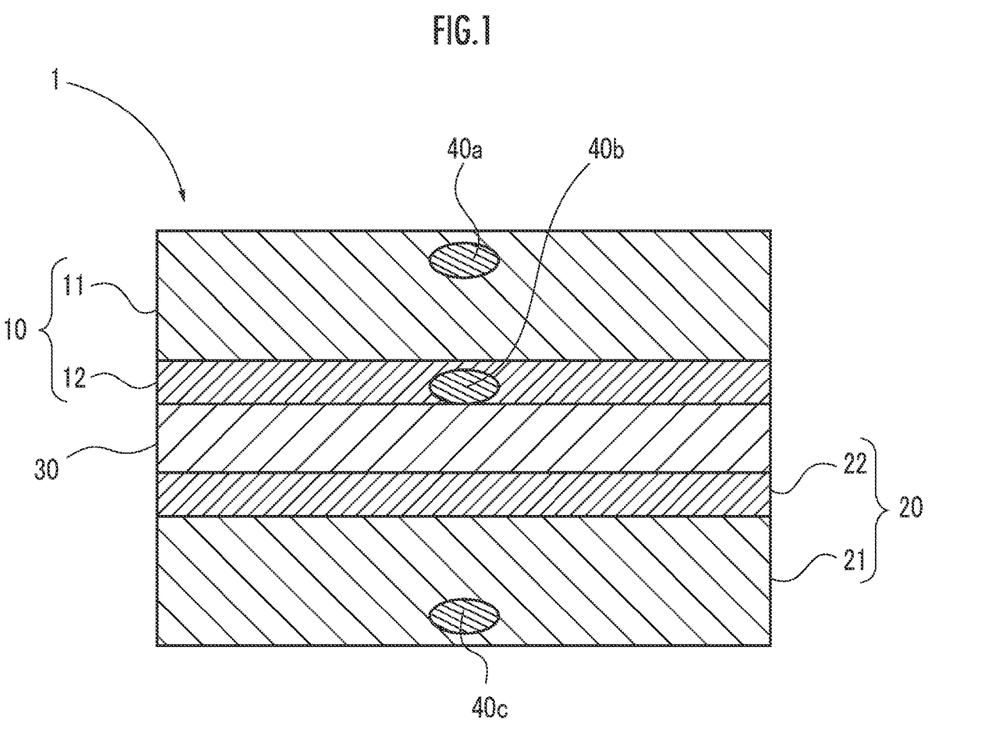
FIG. 1 is an explanatory view schematically illustrating a transmitted X-ray inspection apparatus that is used in a method for inspecting a membrane electrode structure in an embodiment of the present invention.

A method for inspecting a membrane electrode structure in a first embodiment of the present invention will be explained with reference to the figures. As illustrated in FIG. 1, a membrane electrode structure 1, which is to be inspected in the present embodiment, is composed of a first electrode layer 10, a second electrode layer 20, and an electrolyte membrane 30. The electrolyte membrane 30 is sandwiched between the first electrode layer 10 and the second electrode layer 20.

The first electrode layer 10 is composed of a first gas diffusion layer 11 made of a carbon material, such as carbon paper or carbon cloth, and a first electrode catalyst layer 12, and the first electrode catalyst layer 12 is in contact with the electrolyte membrane 30. The first electrode catalyst layer 12 contains a metal catalyst, such as Pt. The second electrode layer 20 is composed of a second gas diffusion layer 21 made of a carbon material, such as carbon paper or carbon cloth, and a second electrode catalyst layer 22, and the second electrode catalyst layer 22 is in contact with the electrolyte membrane 30. The second electrode catalyst layer 22 contains a metal catalyst, such as Pt. The electrolyte membrane 30 is made of a thin membrane of perfluorosulfonic acid.

A manufacturing step of the membrane electrode structure 1 as described above has the following steps, for example. The manufacturing step has a material preparation step of preparing an ink-like electrode catalyst, carbon paper, and the electrolyte membrane 30, an application step of applying the ink-like electrode catalyst to the carbon paper, and a lamination step in which the electrolyte membrane 30 cut into a predetermine size is sandwiched and laminated between the first electrode layer 10 and the second electrode layer 20 which are similarly cut into a predetermine size.

Figure 2:
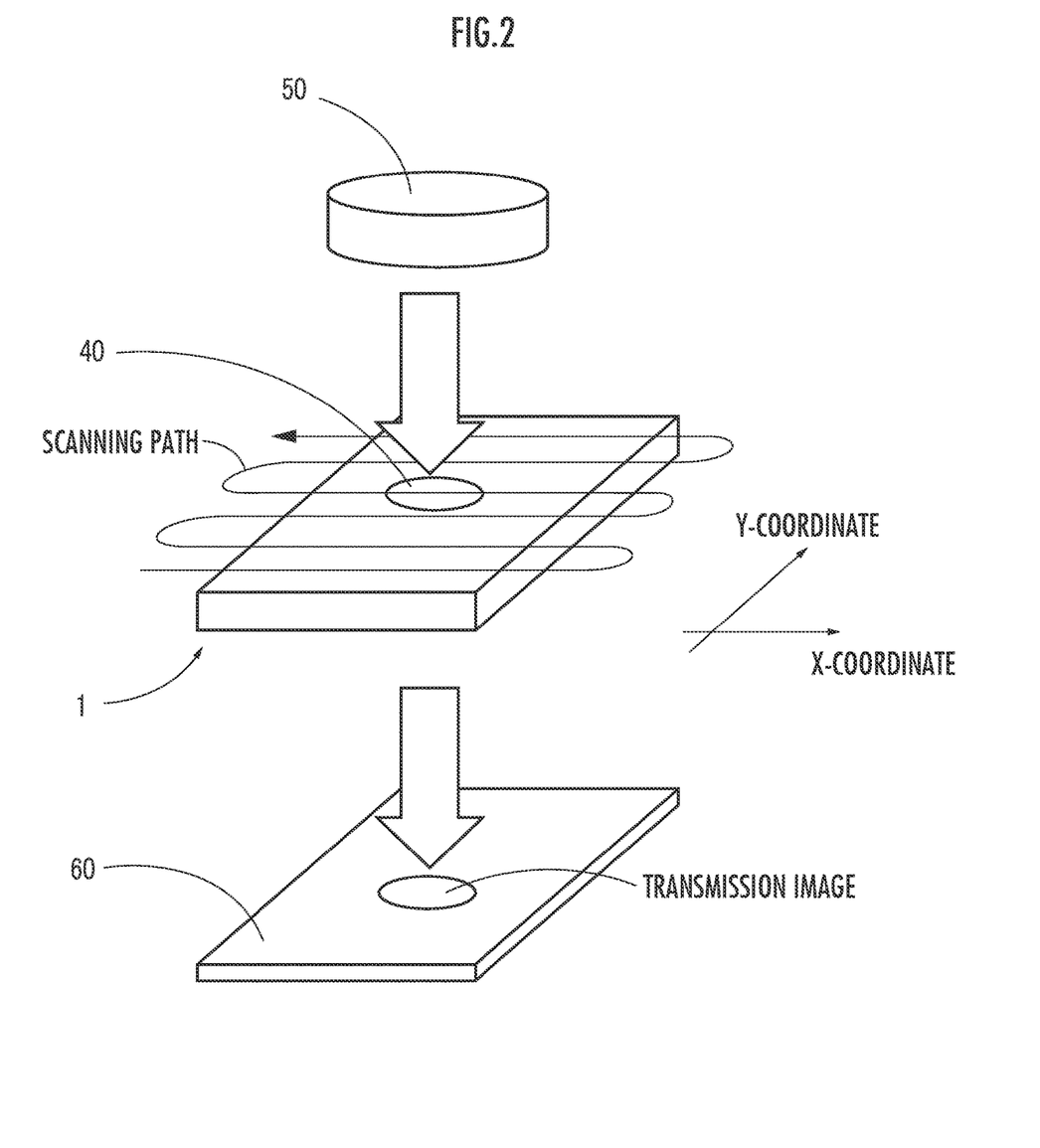
FIG. 2 is an explanatory view schematically illustrating a fluorescent X-ray analysis apparatus that is used in the method for inspecting the membrane electrode structure in the present embodiment.

With respect to the membrane electrode structure 1 formed as above, as illustrated in FIG. 2, as a scanning step, an X-ray as a detection medium is scanned on the entire surface by means of an X-ray irradiation apparatus 50, and from a transmission image obtained from a detector 60 by transmitting the X-ray, it is determined whether a metal foreign matter is detected in the membrane electrode structure 1. Furthermore, when a metal foreign matter 40 is detected, an X-coordinate position and Y-coordinate position of the metal foreign matter 40 are stored in a storage device, such as a hard disk.

Next, a first step is performed in which a detection medium capable of detecting elements of the first electrode catalyst layer 12 and the second electrode catalyst layer 22, or an element of the electrolyte membrane 30, and an element of the metal foreign matter 40 (in the present embodiment, an X-ray) is sent along a thickness direction from the side of the first electrode layer of the membrane electrode structure 1 to the side of the second electrode layer thereof by means of the X-ray irradiation apparatus 50, in which a fluorescent X-ray that is generated from the membrane electrode structure 1 is detected by a detector 70, and in which a thickness direction profile of a detection signal is obtained.

Figure 3:
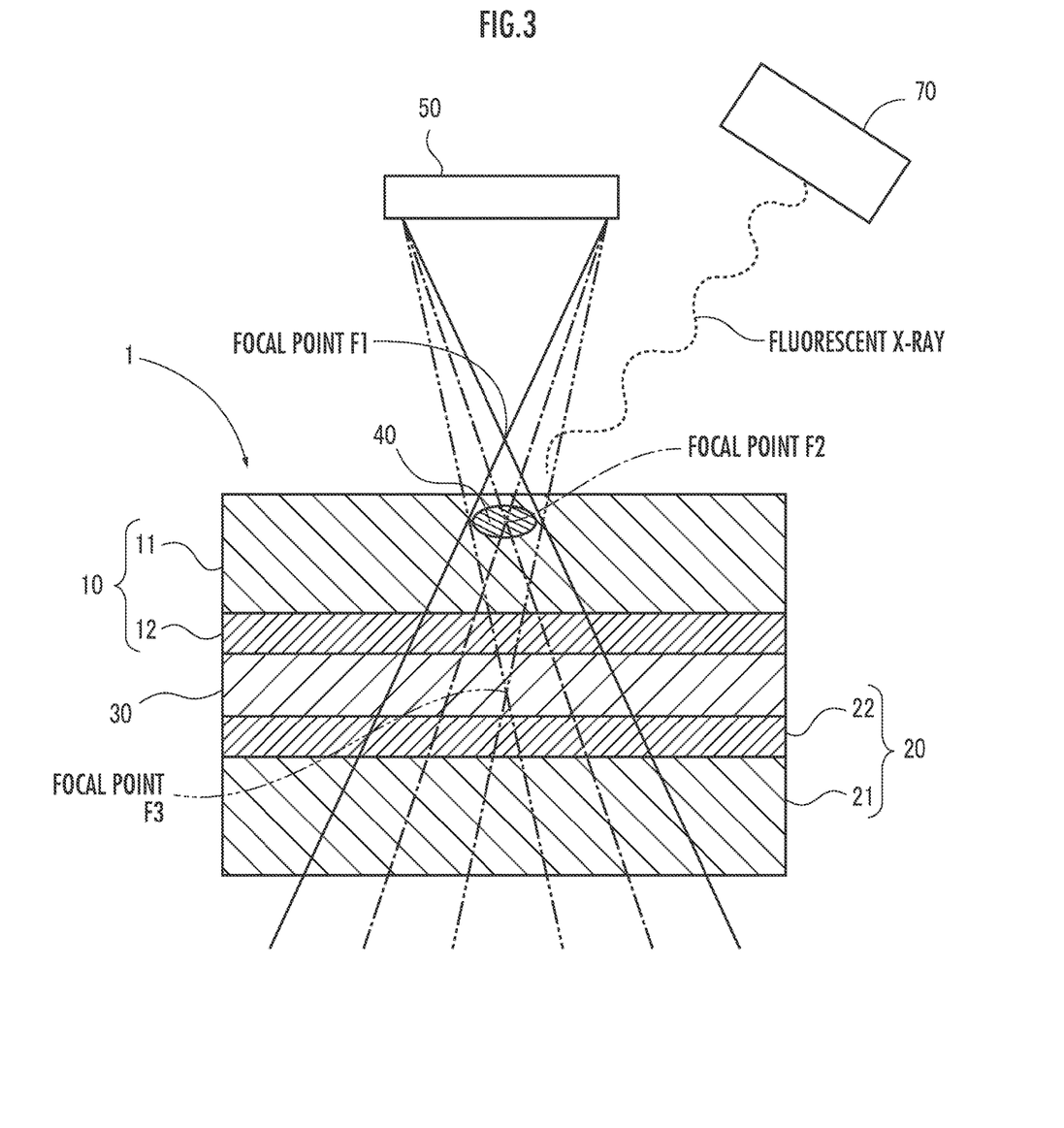
FIG. 3 is a graph illustrating one example of an analysis result of the fluorescent X-ray analysis apparatus in the present embodiment.

The X-ray irradiation apparatus 50 has a high focal accuracy as in a polycapillary lens. As illustrated in FIG. 3, the X-ray irradiation apparatus 50 is used, and a focal point of the X-ray is shifted in the thickness direction of the membrane electrode structure I by moving a support apparatus (not illustrated) that supports the X-ray irradiation apparatus 50 or the membrane electrode structure 1. Then, changes in detection intensity of fluorescent X-ray energy that is detected by the detector 70 are observed, and a position at which the detected detection intensity is the highest is identified as a position at which a metal foreign matter is present. At this time, even if the X-ray hits the gas diffusion layer 11 or 21, or the electrolyte membrane 30, detection intensity of fluorescent X-ray energy from these materials is weak, and thus detection of a metal foreign matter or metal in the electrode catalyst layer is not inhibited. The detector 70 that has received this fluorescent X-ray energy generates a detection signal and sends it to a storage device (not illustrated), such as a hard disk drive.

Figure 4:
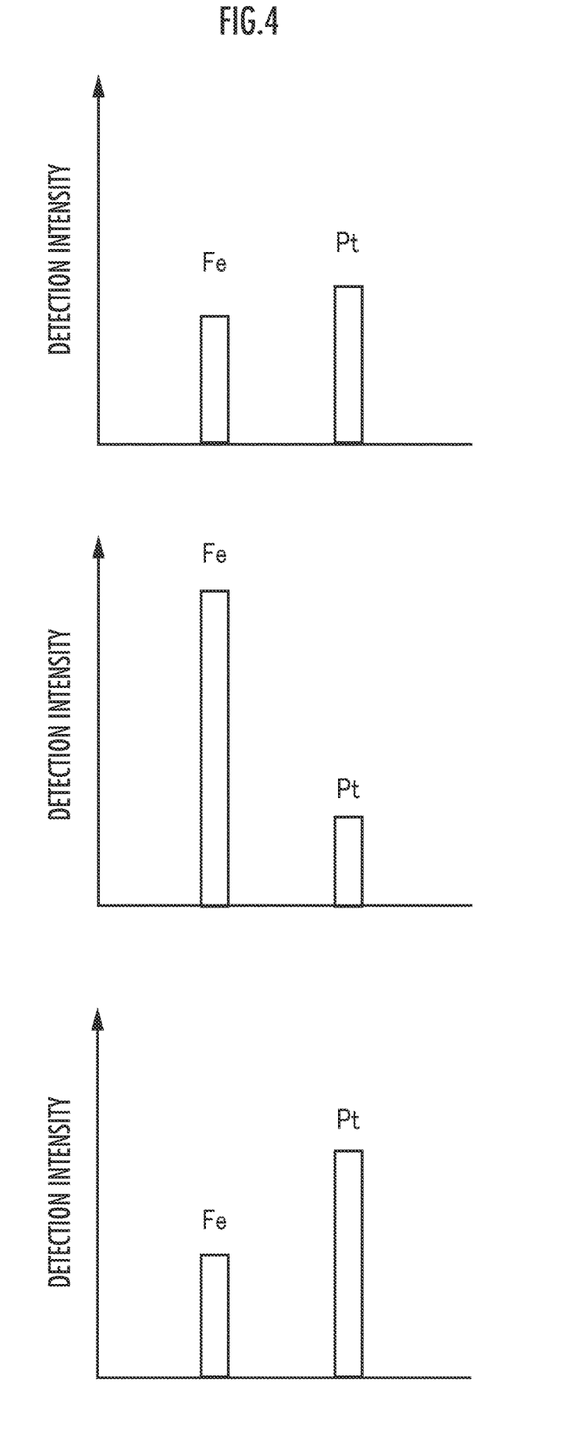
FIG. 4 is a graph illustrating changes in detection intensity in the present embodiment.

FIG. 4 illustrates one example of a detection result (profile) of the fluorescent X-ray energy detected by the detector 70. The detection intensity is analyzed a plurality of times at predetermined intervals in the thickness direction to identify at which location the elements contained in the metal foreign matter 40 (for example, iron powder (Fe)), and the first electrode catalyst layer 12, the second electrode catalyst layer 22, or the electrolyte membrane 30 (for example, Pt) are present in the thickness direction. Although the profile of FIG. 4 indicates only two elements, not limited to this, a profile indicating all of the detected elements may be used.

Figure 5:
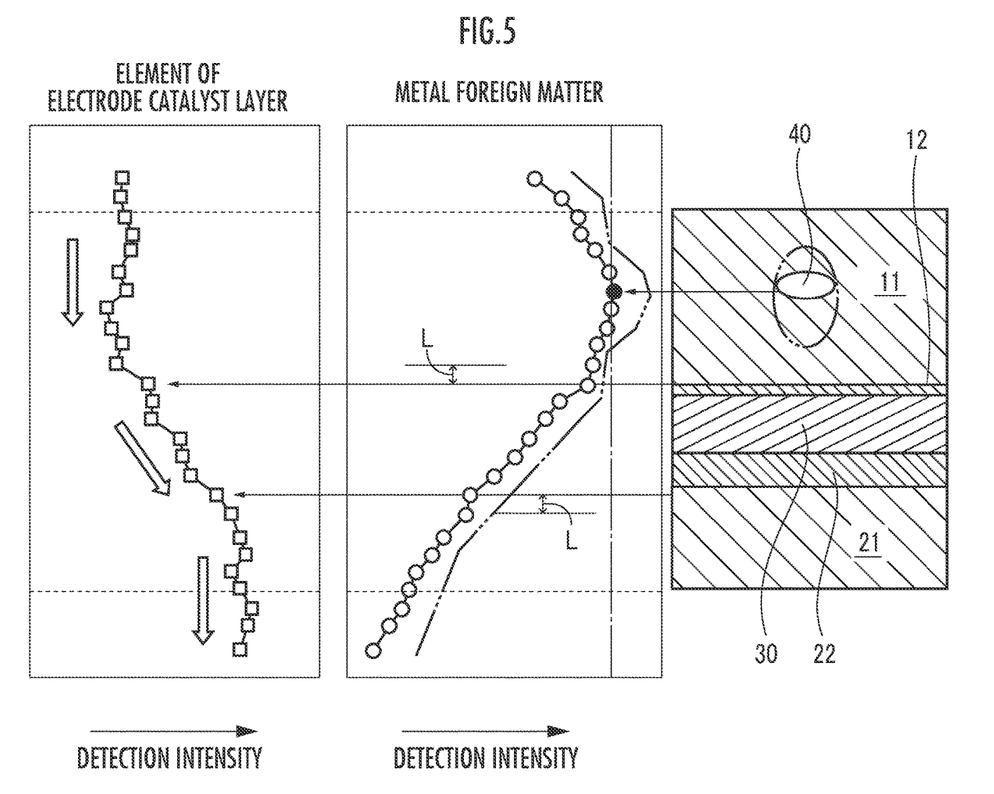
FIG. 5 is an explanatory view schematically illustrating a method for determining whether the membrane electrode structure is a defective product or not in the present embodiment.

FIG. 5 is a graph illustrating transition of detection intensity of the first electrode catalyst layer 12 and the second electrode catalyst layer 22, and the metal foreign matter 40 in the thickness direction. With respect to the metal foreign matter 40, when the metal foreign matter 40 is not present, as the focal point becomes farther from the X-ray irradiation apparatus 50, the detection intensity of the fluorescent X-ray in the detector 70 gradually decreases (for example, 40a and 40c of FIG. 1, focal points F1 and F3 of FIG. 3, and upper and lower graphs of FIG. 4). When the metal foreign matter 40 is present, the peak of the detection intensity is generated (40b of FIG. 1, a focal point F2 of FIG. 3, and a middle graph of FIG. 4), and the position of this peak gives a thickness direction position at which the metal foreign matter 40 is present in the membrane electrode structure 1. Furthermore, when the metal foreign matter 40 is present, the thickness direction size of the metal foreign matter 40 is given by determining a thickness direction region (black circle) with a detection intensity equal to or more than a predetermined value (two-dot chain line of FIG. 5) in the profile of the metal foreign matter 40 (on the right side of the drawing relative to the two-dot chain line).

Furthermore, the detection intensity of the fluorescent X-ray energy of Pt contained in the first electrode catalyst layer 12 or the second electrode catalyst layer 22 gradually increases at a position at which the first electrode catalyst layer 12 or the second electrode catalyst layer 22 is present, and the detection intensity is maintained at a position at which the first electrode catalyst layer 12 or the second electrode catalyst layer 22 is not present (in other words, the position of the first gas diffusion layer 11 or the second gas diffusion layer 21, or the position of the electrolyte membrane 30). Accordingly, it is understood that the first electrode catalyst layer 12 or the second electrode catalyst layer 22 is present at a position at which the detection intensity increases. At this time, from the thickness direction outer sides of the positions of the first electrode catalyst layer 12 and the second electrode catalyst layer 22, ranges of the thicknesses of the first gas diffusion layer 11 and the second gas diffusion layer 21 are identified as the positions of the gas diffusion layers 11 and 21. Furthermore, a range between the positions of the first electrode catalyst layer 12 and the second electrode catalyst layer 22 is identified as the position of the electrolyte membrane 30.

Then, a second step is performed in which an analysis unit identifies the thickness direction position of the metal foreign matter 40, from the intensity of the detection signal in the thickness direction profile, and in which the analysis unit identifies the thickness direction positions of the first gas diffusion layer 11 and the second gas diffusion layer 21, the thickness direction positions of the first electrode catalyst layer 12 and the second electrode catalyst layer 22, and the thickness direction position of the electrolyte membrane 30, from the intensity of the detection signal in the thickness direction profile.

From the positions of the metal foreign matter 40, and the first gas diffusion layer 11 and the second gas diffusion layer 21, the first electrode catalyst layer 12 and the second electrode catalyst layer 22, or the electrolyte membrane 30, it is determined how far apart the metal foreign matter 40 is from the first electrode catalyst layer 12, the second electrode catalyst layer 22, or the electrolyte membrane 30, and when the metal foreign matter 40 is apart from the first electrode catalyst layer 12, the second electrode catalyst layer 22, or the electrolyte membrane 30, at equal to or more than a predetermined value L, the membrane electrode structure 1 is handled as a non-defective product. Thus, the membrane electrode structure 1 is handled as the non-defective product when the metal foreign matter 40, even if detected, is apart from the first electrode catalyst layer 12 and the second electrode catalyst layer 22, or the electrolyte membrane 30, at equal to or more than a predetermined value, so that the yield can be enhanced as compared with a case where it is discarded only due to finding of the metal foreign matter 40.

At this time, the membrane electrode structure 1 is handled as a defective product when the metal foreign matter 40 is not apart from the first electrode catalyst layer 12, the second electrode catalyst layer 22, or the electrolyte membrane 30, at equal to or more than the predetermined value L, for example, when the metal foreign matter 40 is present inside the first electrode catalyst layer 12, the second electrode catalyst layer 22, or the electrolyte membrane 30.

The predetermined value L is set to a value at which the metal foreign matter 40 is present in the first gas diffusion layer 11 or the second gas diffusion layer 21. Alternatively, it is set to a value at which, even if the metal foreign matter 40 is present, the first electrode catalyst layer 12, the second electrode catalyst layer 22, or the electrolyte membrane 30 is not affected and the durability is not influenced, which is determined through, for example, a prior experiment, in accordance with the constituent material of the membrane electrode structure 1. When the metal foreign matter 40 is present in the gas diffusion layer 11 or 21, the membrane electrode structure is handled as the non-defective product.

Note that when a thickness direction region with a detection intensity equal to or more than a predetermined value in the profile of the metal foreign matter 40 is determined and the thickness direction region with the detection intensity equal to or more than the predetermined value (two-dot chain line of FIG. 5)(on the right side of the drawing relative to the two-dot chain line) has equal to or more than a predetermined thickness, even if the metal foreign matter 40 is present in the first gas diffusion layer 11 or the second gas diffusion layer 21, the membrane electrode structure 1 is handled as the defective product.

According to the method for inspecting the membrane electrode structure 1 in the present embodiment, with respect to the first electrode catalyst layer 12 and the second electrode catalyst layer 22, or the electrolyte membrane 30, the thickness direction position of the metal foreign matter 40 in the membrane electrode structure 1 can be identified. Thus, it can be confirmed how far apart the metal foreign matter 40 is from the first electrode catalyst layer 12 and the second electrode catalyst layer 22, or the electrolyte membrane 30, and if the metal foreign matter 40 is sufficiently apart from the first electrode catalyst layer 12 and the second electrode catalyst layer 22, or the electrolyte membrane 30, the membrane electrode structure 1 can be handled as the non-defective product. Note that the predetermined value L is preferably a distance in a direction from an interface between the first electrode catalyst layer 12 and the first gas diffusion layer 11 to an outer surface of the first gas diffusion layer 11. Furthermore, when the metal foreign matter 40 is present in the second gas diffusion layer 21, the predetermined value L is preferably a distance in a direction from an interface between the second electrode catalyst layer 22 and the second gas diffusion layer 21 to an outer surface of the second gas diffusion layer 21.

Furthermore, in the method for inspecting the membrane electrode structure 1 in the present embodiment, provided is, prior to the first step, the scanning step of scanning the surface of the membrane electrode structure 1 and detecting the presence or absence of the metal foreign matter 40, and the first step and the second step are performed at a location where the metal foreign matter 40 has been detected by the scanning step.

According to the method for inspecting the membrane electrode structure 1 in the present embodiment, without the necessity of performing inspection of the metal foreign matter 40 in the thickness direction in the entire surface region of the membrane electrode structure 1, the surface of the membrane electrode structure 1 is scanned, and the thickness direction position can be identified at a location where the metal foreign matter 40 has been found, so that inspection of the membrane electrode structure I can be performed quickly.

A method for inspecting a membrane electrode structure in a second embodiment of the present invention will be explained. The second embodiment differs from the first embodiment only in a step after the second step of identifying the thickness direction positions of the first gas diffusion layer 11 and the second gas diffusion layer 21, the thickness direction positions of the first electrode catalyst layer 12 and the second electrode catalyst layer 22, and the thickness direction position of the electrolyte membrane 30, and thus the explanation will be given by using the same signs.

After the second step of identifying the thickness direction positions of the metal foreign matter 40, and the first gas diffusion layer 11 and the second gas diffusion layer 21, the first electrode catalyst layer 12 and the second electrode catalyst layer 22, and the electrolyte membrane 30, the second embodiment has a fourth step of identifying, of the first gas diffusion layer 11 and the second gas diffusion layer 21, the first electrode catalyst layer 12 and the second electrode catalyst layer 22, and the electrolyte membrane 30, on which layer the metal foreign matter 40 is present.

As illustrated in Table 1, in the fourth step, a manufacturing step in which the metal foreign matter 40 is highly likely to have been mixed is identified by the position of the metal foreign matter 40. The manufacturing step in which the metal foreign matter 40 is highly likely to have been mixed is indicated by "Yes".

When the metal foreign matter 40 is present inside the gas diffusion layer 11 or 21 or inside the electrolyte membrane 30, it is identified that the metal foreign matter 40 was mixed in a material preparation step of preparing each of the materials. Furthermore, when a metal catalyst is present inside the electrode catalyst layer 12 or 22, it is identified that the metal foreign matter 40 was mixed in a material preparation step of preparing an ink-like electrode catalyst or an application step of applying the ink-like electrode catalyst to carbon paper. Furthermore, when the metal foreign matter 40 is present between the gas diffusion layer 11 or 21 and the electrode catalyst layer 12 or 22, it is determined that the metal foreign matter 40 is highly likely to have been mixed in the application step, and when the metal foreign matter 40 is present between the electrode layer 10 or 20, and the electrolyte membrane 30, it is determined that the metal foreign matter 40 is highly likely to have been mixed in a lamination step in which the electrolyte membrane 30 is sandwiched and laminated between the first electrode layer 10 and the second electrode layer 20.

TABLE 1

| Position of metal foreign matter | Material preparation step | Application step | Lamination step |
|---|---|---|---|
| Inside gas diffusion layer | Yes | | |
| Between gas diffusion layer and electrode catalyst layer | | Yes | |
| Inside electrode catalyst layer | Yes | Yes | |
| Between electrode catalyst layer and electrolyte membrane | | | Yes |
| Inside electrolyte membrane | Yes | | |

According to the method for inspecting the membrane electrode structure I in the present embodiment, the manufacturing step that is considered that the metal foreign matter 40 is highly likely to have been mixed is identified, and improving the manufacturing step can prevent mixing of the metal foreign matter 40, enhancing the yield.

Note that the present invention can be preferably used in an embodiment other than the first embodiment and the second embodiment.

For example, although in the embodiment, the positions of the gas diffusion layers 11 and 21 and the position of the electrolyte membrane 30 are indirectly identified by detecting the positions of the first electrode catalyst layer 12 and the second electrode catalyst layer 22, the positions of the gas diffusion layers 11 and 21 or the position of the electrolyte membrane 30 may be directly detected if a detection medium capable of detecting an element of the gas diffusion layer or the electrolyte membrane is used.

Furthermore, although in the fourth step, any of the manufacturing steps of the material preparation step, the application step, and the lamination step is identified as the manufacturing step in which the metal foreign matter 40 was mixed, if, depending on the manufacturing method of the membrane electrode structure 1, there is another manufacturing step in which the metal foreign matter 40 is highly likely to be mixed, the manufacturing step may be identified as the manufacturing step in which the metal foreign matter 40 was mixed.

REFERENCE SIGNS LIST 1 membrane electrode structure
10 first electrode layer
11 first gas diffusion layer
12 first electrode catalyst layer
20 second electrode layer
21 second gas diffusion layer
22 second electrode catalyst layer
30 electrolyte membrane
40 metal foreign matter
50 X-ray irradiation apparatus
60 transmission image detector
70 fluorescent X-ray detector
F1 first focal point
F2 second focal point
F3 third focal point

What is claimed is:

1. A method for inspecting a membrane electrode structure formed by sandwiching an electrolyte membrane between a first electrode layer comprising a first electrode catalyst layer and a first gas diffusion layer, and a second electrode layer comprising a second electrode catalyst layer and a second gas diffusion layer, the method comprising:
a first step in which a detection medium capable of detecting elements of the first electrode catalyst layer and the second electrode catalyst layer or an element of the electrolyte membrane, and an element of a metal foreign matter is sent such that a focal point is moved along a thickness direction from a side of the first electrode layer to a side of the second electrode layer, thereby obtaining a thickness direction profile of a detection signal; and
a second step in which an analysis unit identifies a thickness direction position of the metal foreign matter, from intensity of the detection signal in the thickness direction profile, and in which the analysis unit identifies thickness direction positions of the first electrode catalyst layer and the second electrode catalyst layer, or a thickness direction position of the electrolyte membrane, from the intensity of the detection signal in the thickness direction profile.

2. The method for inspecting the membrane electrode structure according to claim 1, comprising a third step in which the thickness direction position of the metal foreign matter identified by the second step is compared with the thickness direction positions of the first electrode catalyst layer and the second electrode catalyst layer, or the thickness direction position of the electrolyte membrane, and in which, when the metal foreign matter is spaced apart from the first electrode catalyst layer and the second electrode catalyst layer, or the electrolyte membrane, at equal to or more than a predetermined value in the thickness direction, the membrane electrode structure is determined as a non-defective product.

3. The method for inspecting the membrane electrode structure according to claim 2,
wherein the predetermined value is set to a value at which, when the metal foreign matter is present in the first gas diffusion layer or the second gas diffusion layer, the membrane electrode structure is not determined as the defective product.

4. The method for inspecting the membrane electrode structure according to claim 1, comprising, prior to the first step, a scanning step of scanning a surface of the membrane electrode structure and detecting a presence or absence of the metal foreign matter,
wherein the first step and the second step are performed at a location where the metal foreign matter has been detected by the scanning step.

5. The method for inspecting the membrane electrode structure according to claim 1, comprising a fourth step in which the thickness direction position of the metal foreign matter identified by the second step is compared with the thickness direction positions of the first electrode catalyst layer and the second electrode catalyst layer, or the thickness direction position of the electrolyte membrane, and in which, of manufacturing steps of the first electrode catalyst layer and the second electrode catalyst layer, the electrolyte membrane, and the membrane electrode structure, in which manufacturing step the metal foreign matter was mixed is identified.

* * * * *